United States Patent
Knoop et al.

(10) Patent No.: US 11,180,869 B2
(45) Date of Patent: Nov. 23, 2021

(54) MELT SPINNABLE COPOLYMERS FROM POLYACRYLONITRILE, METHOD FOR PRODUCING FIBERS OR FIBER PRECURSORS BY MEANS OF MELT SPINNING, AND FIBERS PRODUCED ACCORDINGLY

(71) Applicant: FRAUNHOFER-GESELLSCHAFT ZUR FÖRDERUNG DER ANGEWANDTEN FORSCHUNG E. V., Munich (DE)

(72) Inventors: Mats Timothy Knoop, Potsdam (DE); Antje Lieske, Potsdam (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 539 days.

(21) Appl. No.: 16/087,015

(22) PCT Filed: Mar. 22, 2016

(86) PCT No.: PCT/EP2016/056194
§ 371 (c)(1),
(2) Date: Sep. 20, 2018

(87) PCT Pub. No.: WO2017/162268
PCT Pub. Date: Sep. 28, 2017

(65) Prior Publication Data
US 2019/0100856 A1  Apr. 4, 2019

(51) Int. Cl.
| | | |
|---|---|---|
| C08F 220/44 | (2006.01) | |
| C08F 2/22 | (2006.01) | |
| C08F 2/04 | (2006.01) | |
| C08F 220/28 | (2006.01) | |
| C08F 216/18 | (2006.01) | |
| D01F 6/38 | (2006.01) | |
| D01D 5/08 | (2006.01) | |
| D01F 9/22 | (2006.01) | |
| C08K 5/00 | (2006.01) | |

(52) U.S. Cl.
CPC .............. *D01F 6/38* (2013.01); *C08F 216/18* (2013.01); *C08F 220/28* (2013.01); *C08F 220/44* (2013.01); *C08K 5/0016* (2013.01); *D01D 5/08* (2013.01); *D01F 9/225* (2013.01); *C08F 2/04* (2013.01); *C08F 2/22* (2013.01); *C08F 220/281* (2020.02)

(58) Field of Classification Search
CPC .... C08F 220/44; C08F 216/18; C08F 220/28; C08F 220/281; C08F 2/04; C08F 2/22; C08K 5/0016; D01F 6/38; D01F 9/225; D01D 5/08
USPC .......................................................... 520/1
See application file for complete search history.

(56) References Cited

U.S. PATENT DOCUMENTS

| | | | |
|---|---|---|---|
| 3,499,073 A | | 3/1970 | Sun et al. |
| 4,062,857 A | * | 12/1977 | Kobashi ................ C08F 220/44 |
| | | | 524/831 |
| 4,107,252 A | | 8/1978 | Richmond |
| 4,163,770 A | | 8/1979 | Porosoff |
| 4,237,256 A | * | 12/1980 | Kobashi ................. C08F 20/44 |
| | | | 524/827 |
| 4,238,442 A | | 12/1980 | Cline et al. |
| 5,168,004 A | | 12/1992 | Daumit et al. |
| 5,618,901 A | | 4/1997 | Smierciak et al. |
| 6,114,034 A | | 9/2000 | Jorkasky, II et al. |
| 7,786,190 B2 | | 8/2010 | Hahn et al. |
| 2007/0270529 A1 | | 11/2007 | Lutzmann et al. |
| 2012/0027944 A1 | | 2/2012 | Yu et al. |
| 2012/0280412 A1 | | 11/2012 | Sitter |
| 2013/0133819 A1 | | 5/2013 | Choi et al. |
| 2017/0275405 A1 | | 9/2017 | Hahn et al. |
| 2017/0298539 A1 | | 10/2017 | Hahn et al. |

FOREIGN PATENT DOCUMENTS

| | | |
|---|---|---|
| DE | 2 042 358 A1 | 4/1971 |
| DE | 2 603 029 A1 | 8/1977 |
| DE | 10 2014 219707 A1 | 3/2016 |
| EP | 0 030 666 A2 | 6/1981 |
| EP | 0 406 709 A2 | 1/1991 |
| GB | 663 268 A | 12/1951 |
| GB | 1 270 504 A | 4/1972 |
| GB | 1 294 044 A | 10/1972 |
| GB | 1 318 377 A | 5/1973 |
| GB | 1 540 905 A | 2/1979 |
| GB | 2 356 830 A | 6/2001 |
| JP | S52-58785 A | 5/1977 |
| JP | S54-30281 A | 3/1979 |
| JP | 2013-103992 A | 5/2013 |
| JP | 2015-200046 A | 11/2015 |
| WO | 00/50675 A1 | 8/2000 |
| WO | 2011/067392 A1 | 6/2011 |

OTHER PUBLICATIONS

Bhanu et al., "Synthesis and characterization of acrylonitrile methyl acrylate statistical copolymers as melt processable carbon fiber precursors," *Polymer* 43(18): 4841-4850 (2002).

Mukundan et al., "A photocrosslinkable melt processible acrylonitrile terpolymer as carbon fiber precursor", *Polymer*, 47: 4163-4171 (2006).

Udakhe et al., "Melt processing of Polyacrylonitrile (PAN) Polymers," *Spinning: Journal of the Textile Association* 71(5): 233-241 (2011).

European Patent Office, International Search Report in International Application No. PCT/EP2016/056194 (dated Jun. 2, 2016).

(Continued)

*Primary Examiner* — Kelechi C Egwim

(74) *Attorney, Agent, or Firm* — Leydig, Voit & Mayer, Ltd.

(57) ABSTRACT

The invention relates to a method for the production of thermally stabilised melt-spun fibres in which polyacrilonitrile (PAN) fibres or PAN fibre precursors produced by melt-spinning are treated in an aqueous alkaline solution, comprising in addition a solvent for PAN. Likewise, the invention relates to fibres which are producible according to this method.

18 Claims, No Drawings

(56) References Cited

OTHER PUBLICATIONS

U.S. Appl. No. 15/513,454, filed Mar. 22, 2017.
U.S. Appl. No. 15/514,421, filed Mar. 24, 2017.
U.S. Appl. No. 15/775,213, filed May 10, 2018.

* cited by examiner

MELT SPINNABLE COPOLYMERS FROM POLYACRYLONITRILE, METHOD FOR PRODUCING FIBERS OR FIBER PRECURSORS BY MEANS OF MELT SPINNING, AND FIBERS PRODUCED ACCORDINGLY

CROSS-REFERENCE TO A RELATED APPLICATION

This patent application is the U.S. national phase of International Application No. PCT/EP2016/056194, filed on Mar. 22, 2016, the disclosure of which is incorporated herein by reference in its entirety for all purposes.

The invention relates to a method for the production of thermally stabilised melt-spun fibres, in which polyacrylonitrile (PAN) fibres or PAN fibre precursors produced by melt-spinning are treated in an aqueous alkaline solution, comprising in addition a solvent for PAN. Likewise, the invention relates to fibres which are producible according to this method.

Carbon fibres are produced, according to the state of the art, by thermal conversion of separately produced precursor fibres. Materials for the precursor fibres are above all PAN (co)polymers (acrylic precursor) and also pitch acrylic precursor fibres have been produced commercially to date exclusively via wet- or dry-spinning processes. In addition, a solution of the polymers with concentrations 20% is spun either in a coagulation bath or a hot steam atmosphere, the solvent diffusing out of the fibre. In this way, qualitatively high-value precursors are produced, however the costs of the processes are comparatively high. This results, on the one hand, from the required solvents and handling thereof, on the other hand, from the relatively low throughput of solvent spinning processes.

Because of the strong inter- and intramolecular interactions of the nitrile groups, the melting point of PAN at 320° C. is above the decomposition temperature of the polymer. This means that melt-spinning of pure PAN is not possible, the polymer does not behave like a thermoplastic but like a duroplastic. At the same time, the possibility of production of precursor fibres by means of melt-spinning would however imply a significant cost saving in the precursor production since the throughput during melt-spinning is substantially higher and in addition no solvents are present which incur costs for procurement and recycling/disposal.

Efforts have therefore been made for several decades to make PAN accessible for processing by means of melt-spinning. In principle, a differentiation must be thereby made between approaches via external plasticisation (mixing of the polymer with additives) and via internal plasticisation (copolymerisation). In both cases, the interaction of the nitrile groups is thereby disturbed such that melting is effected below the decomposition temperature of the polymer.

It is an essential requirement for further processing to form carbon fibres that the possibility exists of subsequently stabilising the fibres oxidatively. This process is implemented at temperatures above 200° C. and results in the formation of cyclic structures which then enable subsequent carbonisation. Of course, this can only be successful if the fibres do not melt at the stabilisation temperatures—which, since the stabilisation temperatures are in general higher than the processing temperatures during melt-spinning, represents an additional problem to be resolved.

Internal Plasticisation:

Internal plasticisation is achieved by copolymerisation with suitable comonomers. The production of thermoplastic acrylonitrile copolymers for fibre production by means of melt-spinning was described already in 1970 in GB 1,270,504. 8-50% by weight of aliphatic/alicyclic alkenes and/or acrylates and 0.2-10% by weight of sulphonic acid group-containing monomers are thereby mentioned as comonomers. Textile fibres are referred to as application field. In the application examples, methyl-, ethyl-, butylacrylate, isobutene, vinyl acetate and propene are listed as comonomers; the spinning temperature at the nozzle was at 200 to 240° C. Such acid group-containing copolymers are however not suitable for a continuous melt-spinning process since the melt viscosity is not stable but rather, in the course of time, increases inevitably because of the acid group-catalysed cyclisation reaction of the nitrile groups. In U.S. Pat. No. 3,499,073, the production of thermoplastic PAN copolymers with the help of an organometallic catalyst is described. The polymers—also homopolymers of PAN—were able to be processed at temperatures of 250° C. to 295° C. to form monofilaments. GB 1,294,044 describes acrylonitrile copolymers which comprise 60-70% acrylonitrile, 25-30% methacrylonitrile and 5-10% acrylates or methacrylates and have softening points between 125° C. and 175° C. At the described softening point, the polymer is however not present as a melt but as a flexible film. In U.S. Pat. No. 4,107,252, copolymers of acrylonitrile with 12-18% by weight of styrene and 13-18% by weight of isobutene are presented, which have melting temperatures between 175° C. and 260° C. However, the comonomer contents are far too high to be able to produce carbon fibres from such copolymers. In general, it is assumed that a PAN copolymer suitable for carbon fibres must comprise an average chain length of 9 successive acrylonitrile units. Realistically, only approx. 10% by mol comonomer content can therefore be tolerated. In EP0 030 666 thermoplastic acrylonitrile copolymers with up to 96% acrylonitrile content for hoses and films are described, which are produced by grafting of acrylonitrile on an elastomer phase. Such polymers have branched structures because of the grafting and are not suitable for fibre production. GB 2,356,830 describes the thermoplastic formation of acrylonitrile polymers with 96-100% acrylonitrile content by means of a special pressure- and temperature regime, however the author excludes the possibility of use for melt-spinning because of the required high extruder pressures.

The most extensive patents for internal plasticisation are held by Standard Oil. U.S. Pat. No. 5,618,901 describes thermoplastic acrylonitrile copolymers, consisting of 50-95% acrylonitrile and 5-50% of a comonomer, firstly all conceivable comonomer classes (acrylates, methacrylates, acrylamides, methacrylamides, acrylamide derivatives, methacrylamide derivatives, vinyl esters, vinyl ethers, vinyl amides, vinyl ketones, styrene, halogen-containing monomers, ionic monomers, acid group-containing monomers, amino group-containing monomers, olefins and combinations) are covered. The embodiments indicate methyl styrene, styrene, vinyl acetate, methyl acrylate and methyl methacrylate with at least 15% by weight proportion (corresponds for methyl acrylate to approx. 10% by mol) of copolymer. The copolymers were able to be extruded at 200° C. U.S. Pat. No. 6,114,034 describes the production of fibres from precisely these copolymers, exclusively methyl acrylate and vinyl acetate being used as comonomers in the embodiments, and in fact in a proportion of 15-25% by weight. Fibres could be produced with diameters of 3-8 dtex and strengths up to 29 cN/tex (15% methyl acrylate) or 55 cN/tex (25% methyl acrylate), the spinning temperatures were, as a function of the molar mass, between 210° C. (55,000 g/mol) and 240° C. (90,000 g/mol). In WO 00/50675, the use of the above-described copolymers for the production of carbon fibre precursors is disclosed. With respect to content, the patent does not however go beyond U.S. Pat. No. 6,114,034. Methyl acrylate, ethyl acrylate, methyl methacrylate and vinyl acetate are indicated as preferred comonomers.

However, some works show that such copolymers do not have a stable melt viscosity. A copolymer with 10% by mol of methyl acrylate and a molar mass of 126,000 g/mol showed, after 20 min at 200° C., a rise in the complex viscosity by 35%, a copolymer with 20% by mol of methyl acrylate and a molar mass of 68,000 g/mol still an increase in complex viscosity by 10%. This is likewise verified by the scientific literature (Bhanu et al.; Polymer 43 (2002) 4841-4850).

External Plasticisation:

US 2012/0027944 A1 describes the use of ionic liquids in mass ratios of 1:1 to 1:0.25 for external plasticisation of PAN homopolymers. US 2007/0270529 A1 describes the blending of PAN with aromatic commercial thermoplastics with the addition of compatibilising agents and thermal stabilisers. In both cases, the polymer comprises, furthermore, the external plasticisers after melt-spinning so that a qualitatively lower-value precursor fibre and a reduction in carbon yield during carbonisation are unavoidable.

Various patents (for example EP0 406 709 A2; U.S. Pat. Nos. 4,238,442; 4,163,770) describe the use of water as external plasticiser, either alone or in combination with other solvents, such as nitroalkanes, glycols etc. For processing such plasticised PANs by means of melt-spinning, a special melt-spinning apparatus is required, with which the fibre is spun into a pressure zone in order firstly to make possible fibre formation; during the subsequent pressure release, the water evaporates in a controlled manner. For these processes, PAN copolymers are used, which correspond to standard PAN precursors used for wet-spinning processes and comprise in general, in addition to approx. 99-96% acrylonitrile units, approx. 3-6% of a (meth)acrylate and approx. 0.5-1% of an acid group-containing monomer. Analogously to the above-operated, internally plasticised systems, problems constantly occur also for the described systems with external plasticisers, which can be attributed to unstable melt viscosities.

Oxidative stabilisation of the fibres is not required for fibres which are made thermoplastic with low-boiling plasticisers, such as water and/or the above-mentioned organic solvents; after evaporation of the external plasticiser, the fibre is unmeltable again and can be stabilised analogously to solution-spun PAN fibres.

It applies in total: irrespective of the type of plasticisation, the thermal stability of the melt-spinnable copolymers is the crucial criterion for a commercially usable melt-spinning process. Any thermal instability prevents a long-term-stable spinning process. It leads to cracks at hot spots in the spinning extruder, the spinning pump and the spinning nozzle and to defects in the spun fibre. In all the solutions of internal and external plasticising portrayed in the state of the art, this problem occurs.

Starting herefrom, it was the object of the present invention to provide precursors based on polyacrylonitrile which demonstrate an enhanced suitability for melt-spinning processes.

This object is achieved by the copolymer, the method for the production of fibres by means of melt-spinning, and the fibre having the disclosed features. Further disclosed are advantageous developments.

According to the invention, a melt-spinnable copolymer of polyacrylonitrile (PAN) is provided, which is producible by a copolymerisation of 99.9 to 80% by mol of acrylonitrile with at least one comonomer, the at least one comonomer being selected from a) 0.1 to less than 5% by mol, in particular 0.1 to 4.9% by mol, of at least one alkoxyalkylacrylate of the general formula I,

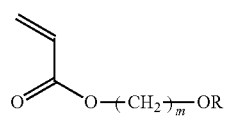

I with $R=C_nH_{2n}+1$ and $n=1-8$ and $m=1-8$, in particular $n=1-4$ and $m=1-4$ b) 0 to 10% by mol of at least one alkylacrylate of the general formula II

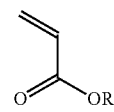

II with $R=C_nH_{2n}+1$ and $n=1-18$, c) 0 to 10% by mol of at least one vinyl ester of the general formula III

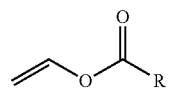

III with $R=C_nH_{2n}+1$ and $n=1-18$, d) 0 to 10% by mol of at least one vinyl ether of the general formula IV

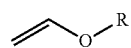

IV with $R=C_nH_{2n}+1$ and $n=1-18$, the sum of the comonomers a) to d) being at most 20% by mol.

The copolymer thereby has an average-weight molar mass (Mw) in the range of 10,000 to 150,000 g/mol.

Preferably the copolymer, preferably with the addition of at least one external plasticiser, is spinnable in the temperature range of 160 to 220° C.

The copolymer according to the invention, preferably with the addition of at least one external plasticiser, preferably has a melt viscosity which is constant or decreases with increasing temperature up to 240° C., in particular up to 260° C. This verifies that the copolymer according to the invention has particularly high stability of the melt viscosity.

Preferably, the copolymerisation is implemented by a precipitation polymerisation, an emulsion polymerisation and/or a polymerisation in a solvent. The solvent is thereby preferably selected from the group consisting of dimethylsulphoxide, dimethylformamide, dimethylacetamide, N-methylpyrrolidone, ethylene carbonate, propylene carbonate, aqueous sodium rhodanide solution and mixtures hereof.

The proportion of the at least one alkoxyalkylacrylate is preferably 3.0 to 4.9% by mol, particularly preferably 3.5 to 4.8% by mol.

A further preferred embodiment provides that a mixture of comonomers of at least one alkoxyalkylacrylate and at least one alkylacrylate is present. The proportion of the at least one alkylacrylate can thereby be preferably in the range of 1 to 5% by mol.

A further preferred embodiment provides that a mixture of at least one alkoxyalkylacrylate and at least one vinyl ester is present. The proportion of the at least one vinyl ester is thereby preferably in the range of 1 to 5% by mol. It is further preferred that the copolymer has an average-weight molar mass (Mw) in the range of 15,000 to 80,000 g/mol.

Likewise it is also possible that alkoxyalkylacrylates in combination with alkylacrylates and vinyl esters are used as comonomers.

According to the invention, a method for the production of fibres or fibre precursors by means of melt-spinning is likewise provided, in which i. a copolymerisation of 99.9 to 80% by mol of acrylonitrile with at least one comonomer selected from a) 0.1 to less than 5% by mol, in particular 0.1 to 4.9% by mol, of at least one alkoxyalkylacrylate of the general formula I,

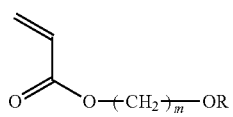

with $R=C_nH_{2n}+1$ and n=1-8 and m=1-8, in particular n=1-4 and m=1-4 b) 0 to 10% by mol of at least one alkylacrylate of the general formula II

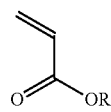

with $R=C_nH_{2n}+1$ and n=1-18, c) 0 to 10% by mol of at least one vinyl ester of the general formula III

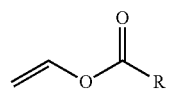

with $R=C_nH_{2n}+1$ and n=1-18, d) 0 to 10% by mol of at least one vinyl ether of the general formula IV

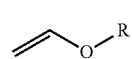

with $R=C_nH_{2n}+1$ and n=1-18, the sum of the comonomers a) to d) being at most 20% by mol, is implemented in the presence of at least one initiator, ii. the copolymer is spun with a melt-spinning unit comprising an extruder, a melt pump and at least one nozzle, suitable for spinning, to form mono- or multifilaments.

It is thereby possible that, immediately before or during extrusion in (ii.), at least one plasticiser is added, which is selected in particular from the group consisting of water, acetonitrile, nitroalkanes, alkyl alcohols, ionic liquids, glycols, dimethylsulphoxide, dimethylformamide, dimethylacetamide, N-methylpyrrolidone, ethylene carbonate, propylene carbonate, aqueous sodium rhodanide solution and mixtures hereof. If a plasticiser is added, a pressure chamber can be connected subsequent to the spinning nozzle in order to prevent explosion-like evaporation of plasticisers boiling below processing temperatures.

In the case where the fibres concern carbon fibres, preferably the two following subsequent steps are implemented:

i. stabilisation of the filaments by a temperature treatment at temperatures of 200 to 350° C. and ii. carbonisation of the filaments at temperatures of 800 to 1,200° C.

The stabilisation of the filaments is effected preferably at temperatures of 220 to 320° C., particularly preferably in the range of 250 to 300° C.

It is further preferred that, during the copolymerisation in step (i.), the initiator of the radical polymerisation is selected from the group consisting of azo compounds, peroxides, hydroperoxides, alkyl peroxides, peroxodicarbonates, peroxy esters, dialkylperoxides, persulphates, perphosphates, redox initiators and mixtures hereof.

According to the invention, fibres, in particular carbon fibres, are likewise provided, which fibres are producible according to the previously described method.

The subject according to the invention is intended to be explained more with reference to the subsequent example without wishing to restrict said subject to the specific embodiments shown here.

EXAMPLE

A PAN copolymer with an end solid content of 20% and with the following characteristics was produced in an emulsion polymerisation: composition: 4.4% by mol of methoxyethylacrylate, 3.1% by mol of methylacrylate, 0.5% by mol of itaconic acid.

The polymer dispersion was precipitated in 0.1% aluminium sulphate solution, the precipitated polymer was washed extensively with water and ethanol and dried in a vacuum at 50° C.

The relative viscosity of a 1% DMSO solution at 30° C. is at 1.8.

The polymer powder was mixed in a mixer with acetonitrile and water, the total mixture comprised 14% by weight of acetonitrile and 14% by weight of water. Subsequently, the polymer was able to be melt-spun using a 40-hole nozzle at a nozzle temperature of 190° C., the melt-spinning unit used being equipped with a pressure chamber located subsequent to the spinning nozzle in accordance with U.S. Pat. No. 5,168,004. The fibres had a single filament titre of 5 dtex, a round cross-section and a compact, cavity-free inner structure.

The invention claimed is:

1. A melt-spinnable copolymer of polyacrylonitrile (PAN), which is produced by copolymerisation of 99.9 to 80% by mol of acrylonitrile with at least one comonomer selected from
   a) 0.1 to less than 5% by mol of at least one alkoxyalkylacrylate of the general formula I,

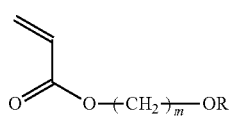

with $R=C_nH_{2n+1}$ and $n=1-18$ and $m=1-8$, b) 0 to 10% by mol of at least one alkylacrylate of the general formula II

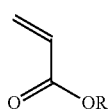

with $R=C_nH_{2n+1}$ and $n=1-18$, c) 0 to 10% by mol of at least one vinyl ester of the general formula III

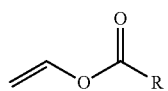

with $R=C_nH_{2n+1}$ and $n=1-18$, and d) 0 to 10% by mol of at least one vinyl ether of the general formula IV

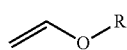

with $R=C_nH_{2n+1}$ and $n=1-18$, the sum of the comonomers a) to d) being at most 20% by mol and the copolymer having an average-weight molar mass (Mw) in the range of 10,000 to 150,000 g/mol.

2. The copolymer according to claim 1, which is spinnable in a temperature range of 160 to 240° C. with an addition of at least one external plasticizer.

3. The copolymer according to claim 1, which has a melt viscosity which is constant or decreases with increasing temperature up to 240° C.

4. The copolymer according to claim 2, wherein the at least one external plasticizer is selected from the group consisting of water, acetonitrile, nitroalkanes, alkyl alcohols, ionic liquids, glycols, dimethyl sulphoxide, dimethylformamide, dimethylacetamide, N-methylpyrrolidone, ethylene carbonate, propylene carbonate, aqueous sodium rhodanide solution, and mixtures thereof.

5. The copolymer according to claim 1, wherein the copolymerisation is effected by a precipitation polymerisation in an aqueous medium, an emulsion polymerisation in an aqueous medium, and/or a polymerisation in a solvent.

6. The copolymer according to claim 5, wherein the solvent is selected from the group consisting of dimethylsulphoxide, dimethylformamide, dimethylacetamide, N-methylpyrrolidone, ethylene carbonate, propylene carbonate, aqueous sodium rhodanide solution, and mixtures thereof.

7. The copolymer according to claim 1, wherein comonomer a) is present in an amount of 3.0 to 4.9% by mol.

8. The copolymer according to claim 1, wherein comonomer in b) is present in an amount of 1 to 5% by mol.

9. The copolymer according to claim 1, wherein comonomer in c) is present in an amount of 1 to 5% by mol.

10. The copolymer according to claim 1, wherein comonomer in d) is present in an amount of 1 to 5% by mol.

11. The copolymer according to claim 1, wherein the copolymer has an average-weight molar mass (Mw) in the range of 15,000 to 100,000 g/mol.

12. A method for the production of fibres or fibre precursors by melt-spinning, in which
    i) a copolymerisation of 99.9 to 80% by mol of acrylonitrile with at least one comonomer selected from
       a) 0.1 to less than 5% by mol of at least one alkoxyalkylacrylate of the general formula I,

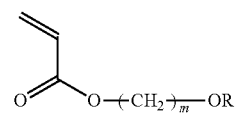

with $R=C_nH_{2n+1}$ and $n=1-18$, b) 0 to 10% by mol of at least one alkylacrylate of the general formula II

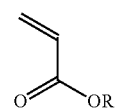

with $R=C_nH_{2n+1}$ and $n=1-18$, c) 0 to 10% by mol of at least one vinyl ester of the general formula III

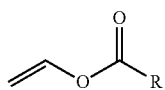

with $R=C_nH_{2n+1}$ and $n=1-18$, and d) 0 to 10% by mol of at least one vinyl ether of the general formula IV

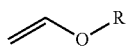

with $R=C_nH_{2n+1}$ and $n=1-18$, the sum of the comonomers a) to d) being at most 20% by mol, is implemented in the presence of at least one initiator, and ii) the copolymer is spun with a melt-spinning unit comprising an extruder, a melt pump, and at least one nozzle suitable for spinning, to form mono- or multi-filaments.

13. The method according to claim 12, wherein, immediately before or during the extrusion in ii), at least one external plasticizer is added, wherein the at least one external plasticizer is selected from the group consisting of water, acetonitrile, nitroalkanes, alkyl alcohols, ionic liquids, glycols, dimethyl sulphoxide, dimethylformamide, dimethylacetamide, N-methylpyrrolidone, ethylene carbonate, propylene carbonate, aqueous sodium rhodanide solution, and mixtures thereof.

14. The method according to claim 12, wherein the fibres are carbon fibres, and the method further includes:
   iii) stabilizing the filaments by a temperature treatment at a temperature of 200 to 350° C. and
   iv) carbonizing the filaments at a temperature of 800 to 1,200° C.

15. The method according to claim 14, wherein the stabilizing of the filaments is effected at a temperature of 220 to 320° C.

16. The method according to claim 12, wherein the initiator is selected from the group consisting of azo compounds, peroxides, hydroperoxides, alkylperoxides, peroxodicarbonates, peroxy esters, dialkylperoxides, persulphates, perphosphates, redox initiators, and mixtures hereof.

17. A fibre produced by spinning the copolymer according to claim 1.

18. The fibre according to claim 17, which is a carbon fibre.

* * * * *